W. C. CARR.
WEIGHING SCALE.
APPLICATION FILED NOV. 19, 1908.

1,006,464.

Patented Oct. 24, 1911.

Witnesses.
L. M. Daugster.
George A. Neubauer.

William C. Carr. Inventor.
By A. J. Daugster
Attorney.

COLUMBIA PLANOGRAPH CO., WASHINGTON, D. C.

UNITED STATES PATENT OFFICE.

WILLIAM C. CARR, OF BUFFALO, NEW YORK.

WEIGHING-SCALE.

1,006,464.  Specification of Letters Patent.  Patented Oct. 24, 1911.

Application filed November 19, 1908. Serial No. 463,361.

*To all whom it may concern:*

Be it known that I, WILLIAM C. CARR, a citizen of the United States, residing at Buffalo, in the county of Erie and State of New York, have invented a certain new and useful Improvement in Weighing-Scales, of which the following is a specification.

This invention relates to an improvement in weighing scales and the object of the invention is to make provision for indicating the total weight of the articles placed upon the scales and also the individual weight of each article as it is placed upon the scales.

The invention also relates to certain details of construction of the weight indicating mechanism which will be hereinafter described and claimed reference being had to the accompanying drawings in which a preferred adaptation of the invention is shown.

Figure 1:
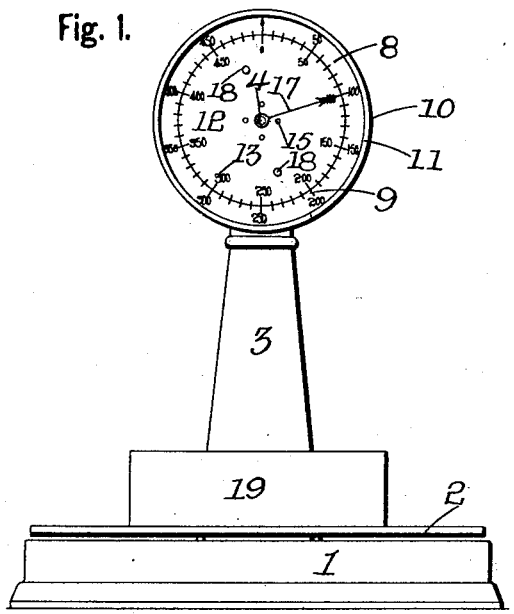
Figure 2:
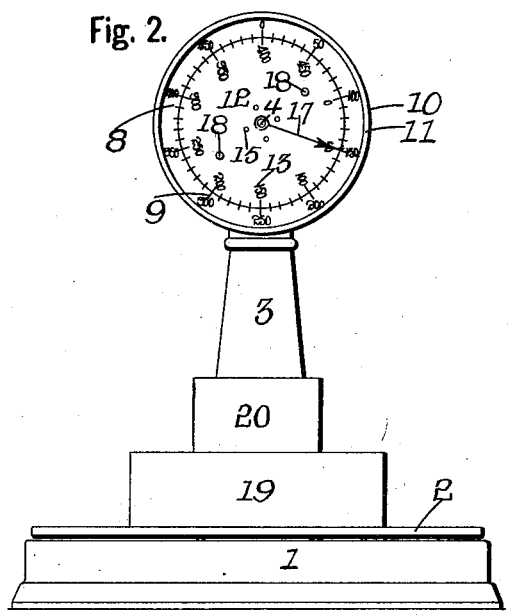
Figure 3:
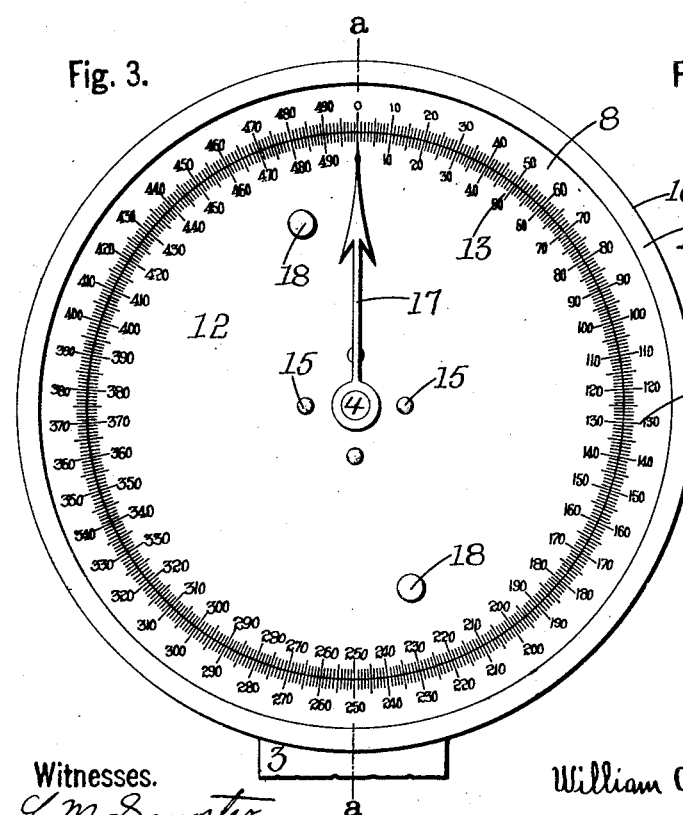
Figure 4:
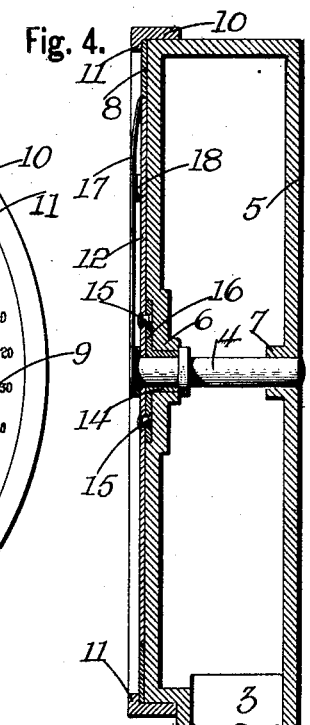

Figure 1 represents a side elevation of the improved weighing scales having thereon a package weighing one hundred pounds as indicated by the indicating pointer which is at the numeral one hundred on both of the weight indicating graduations. Fig. 2 represents a side elevation of the improved weighing scales having thereon two packages weighing one hundred pounds and fifty pounds respectively, the entire weight of the two packages being indicated by the numerals one hundred and fifty on one of the weight indicating graduations and the weight of the second and smaller package being indicated by the numeral 50 on the other weight indicating graduation. Fig. 3 is an enlarged face view of the weight indicating mechanism. Fig. 4 is a central vertical section on line *a a*, Fig. 3.

In referring to the preferred adaptation shown in the drawings, like numerals designate like parts.

The invention is designed to indicate the total weight of the packages placed upon the weighing scales and separately the individual weight of each package placed upon the scales.

In the preferred adaptation shown the weight indicating mechanism is connected to a weighing scale of well known type of which 1 designates the base, 2 the weighing platform and 3 the upright standard.

The type of weight indicating mechanism shown has a shaft 4 which is journaled in the enlarged circular head 5 of the standard 3 being fitted in bearings 6 and 7 in respectively front and rear sides of the head which is made hollow to contain the usual mechanism for connecting the shaft 4 to the weighing platform 2.

A ring 8 having a circular series of weight indicating graduations or scales 9 is secured upon the front side of the head 5 by an annular locking sleeve 10 which fits firmly around the head as shown in Fig. 4 and has an inwardly extending flange 11 that projects over the ring 8.

A revoluble circular disk, or dial 12 having a circular series of weight indicating graduations or scales 13 is located on the front side of the head within the ring 8 and a hub 14 which is loosely mounted on the shaft 4 so as to rotate independently thereon is fastened to the dial 12 by rivets or other suitable fasteners 15 which pass through the dial and a flange 16 on the outer extremity of the hub see Fig. 4.

An indicating pointer 17 is rigidly fastened to the outer end of the shaft 4 which serves to indicate weight on both of the weight indicating graduations.

The revoluble dial 12 is provided with projecting knobs 18 which are grasped by the fingers of the operator to conveniently turn the dial.

The operation of the improved weighing scales is as follows,—A package being placed upon the weighing platform, its weight is indicated upon both graduating scales by the indicating pointer. The dial is now turned by the knobs to bring the numeral "0" of its graduating scale in registering position with the indicating pointer. The placing of another package on the weighing platform will again cause the indicating pointer to move and indicate the total weight of both packages on the graduating scale of the ring and the individual weight of the second package on the graduating scale of the dial. This will be easily understood by reference to Figs. 1 and 2. In Fig. 1 a package 19 has been placed upon the weighing platform and weighs one hundred pounds as indicated by both graduating scales. In Fig. 2 another package 20 has been added being placed upon the package 19. The total weight of both packages, one hundred and fifty pounds is indicated by the graduating scale on the ring and the individual weight of the second package 20 by the graduating scale of the dial.

The purpose of this improvement is to enable the operator weighing packages to instantly ascertain the total weight of all the packages and also the individual weight of each package as it is placed on the weighing scales.

It will be observed that in the preferred adaptation of the invention both graduating scales are arranged concentrically and in proximity so that one indicating pointer will serve for both.

I claim—

1. In a weighing scales, a standard having a circular head, an outer ring having a circular series of weight indicating graduations, an annular locking sleeve fitted firmly around the circular head and having an inwardly extending flange which projects over the outer end, a central shaft journaled in the circular head, a disk located within the outer ring and also having a circular series of weight indicating graduations and provided with a central hub loosely journaled on the central shaft and an indicating pointer fastened to the outer end of the central shaft.

2. In a weighing scales, a standard having a circular head, an outer ring having a circular series of weight indicating graduations, an annular locking sleeve fitted firmly around the circular head and having an inwardly extending flange which projects over the outer end, a central shaft journaled in the circular head, a disk located within the outer ring and also having a circular series of weight indicating graduations and provided with a central hub loosely journaled on the central shaft, an indicating pointer fastened to the outer end of the central shaft and turning knobs projecting from the outer ends of the disk.

WILLIAM C. CARR.

Witnesses:
L. M. SANGSTER,
GEORGE A. NEUBAUER.

---

Copies of this patent may be obtained for five cents each, by addressing the "Commissioner of Patents, Washington, D. C."